United States Patent
Pehrson et al.

(10) Patent No.: US 6,630,807 B2
(45) Date of Patent: Oct. 7, 2003

(54) CONVERTIBLE POWER TOP CONTROL SYSTEM

(75) Inventors: Alona E Pehrson, Rochester Hills, MI (US); James E Zondag, Macomb, MI (US); Kenneth R Martek, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/134,117

(22) Filed: Apr. 26, 2002

(65) Prior Publication Data

US 2002/0158596 A1 Oct. 31, 2002

Related U.S. Application Data

(60) Provisional application No. 60/286,937, filed on Apr. 27, 2001.

(51) Int. Cl.$^7$ .............................. H02P 7/00; G05B 23/02

(52) U.S. Cl. ........................................ 318/445; 318/565

(58) Field of Search ................................. 318/445, 446, 318/563, 565, 603, 626, 364–366

(56) References Cited

U.S. PATENT DOCUMENTS

| | | | | |
|---|---|---|---|---|
| 4,884,070 A | * | 11/1989 | Hannaford | 340/825.78 |
| 5,054,686 A | * | 10/1991 | Chuang | 236/49.3 |
| 5,321,345 A | * | 6/1994 | Lambros et al. | 318/483 |
| 5,451,849 A | * | 9/1995 | Porter et al. | 318/466 |
| 6,169,379 B1 | * | 1/2001 | Zhang et al. | 318/280 |
| 6,252,363 B1 | * | 6/2001 | Grady | 318/266 |
| 6,273,460 B1 | * | 8/2001 | Cox | 280/735 |
| 6,297,609 B1 | * | 10/2001 | Takahashi et al. | 318/484 |
| 2003/0052635 A1 | * | 3/2003 | Schindler et al. | 318/445 |

* cited by examiner

*Primary Examiner*—Robert E. Nappi
*Assistant Examiner*—Patrick Miller
(74) *Attorney, Agent, or Firm*—Edwin W. Bacon, Jr.

(57) ABSTRACT

A method and system of controlling a movable body portion of a vehicle where the body portion is moved by a motor responding to a control input. Power is applied to the motor upon actuation of the control input and a timer is maintained concurrent with the application of power. Power is removed from the motor as a function of expiration of the timer or relinquishment of the control input. The timer provides a maximum amount of time that power may be applied to the motor, thereby preventing damage to the movable body portion in the event it becomes jammed while being moved by the motor.

5 Claims, 3 Drawing Sheets

CONVERTIBLE POWER TOP CONTROL SYSTEM

PRIORITY CLAIM

This application claims the benefit of U.S. Provisional Application No. 60/286,937, filed on Apr. 27, 2001.

FIELD OF THE INVENTION

This invention relates generally to control systems for automobile power convertible tops and power windows, and more particularly to a method of controlling an automobile power convertible top and power windows.

BACKGROUND

In the field of automotive design, convertible tops are used to provide automobiles that are capable of being driven with the top down or the top up. The drivers and passengers of convertible top automobiles often prefer to drive the vehicle with the top down when the weather outside is pleasant and place the top up when the weather turns foul or cold. Occupants of the vehicle also frequently put the automobile windows in the same position as the convertible top. That is, when the top is down, the occupants prefer to also have the windows down and vice-versa.

Typically, convertible tops are mechanically coupled to an electric motor that raises and lowers the convertible top in response to a command from an operator. The command is usually given through a power top switch conveniently located in the passenger compartment of the automobile, such as on the dash or center console. Similarly, typical power window arrangements are driven by electric motors that raise and lower the windows in response to commands from power window switches.

On vehicles having both a power convertible top and power windows, it is desirable to provide a control system that lowers the convertible top and windows with a single push of a button instead of the separate power top and window switches mentioned above. It is further desirable to provide a control system that protects the components of the convertible top structure and moving mechanism from damage due to excessive drive forces of the power top motor in the event the top structure becomes jammed while moving. Known control systems monitor the movement or position of the convertible top and turn off power to the electric motor when the top is completely raised, lowered, or becomes jammed. Such control systems require a feedback path that provides the control system with instantaneous information related to the positions of the structure members of the convertible top. These feedback paths require hardware that adds cost to the convertible top assembly, increases complexity in the assembly process, and requires maintenance.

SUMMARY OF THE INVENTION

The present invention provides a method and apparatus for controlling the raising and lowering of an automobile body member, such as a convertible top or power window.

One aspect of the invention is to provide a convertible top control system that is integral to a power window control system, where the combined control system has the capability of raising and lowering the convertible top and power windows in response to a single operator input or switch actuation.

Another aspect of the invention is to provide a convertible top control system that raises and lowers the top in response to a single operator input, where the control system operates without need for a feedback path.

In accordance with these aspects, a method of controlling a movable body portion of a vehicle is provided where the body portion is moved by a motor that responds to a control input. The method applies power to the motor upon actuation of the control input and maintains a timer concurrent with the application of power. Power is removed from the motor upon the earliest occurrence of either the expiration of the timer or the relinquishment of the control input. The timer provides a maximum amount of time that power may be applied to the motor, thereby preventing damage to the convertible top in the event it becomes jammed while it is being moved by the motor.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

DETAILED DESCRIPTION OF THE PREFERRED EMBODIMENT

Figure 1:
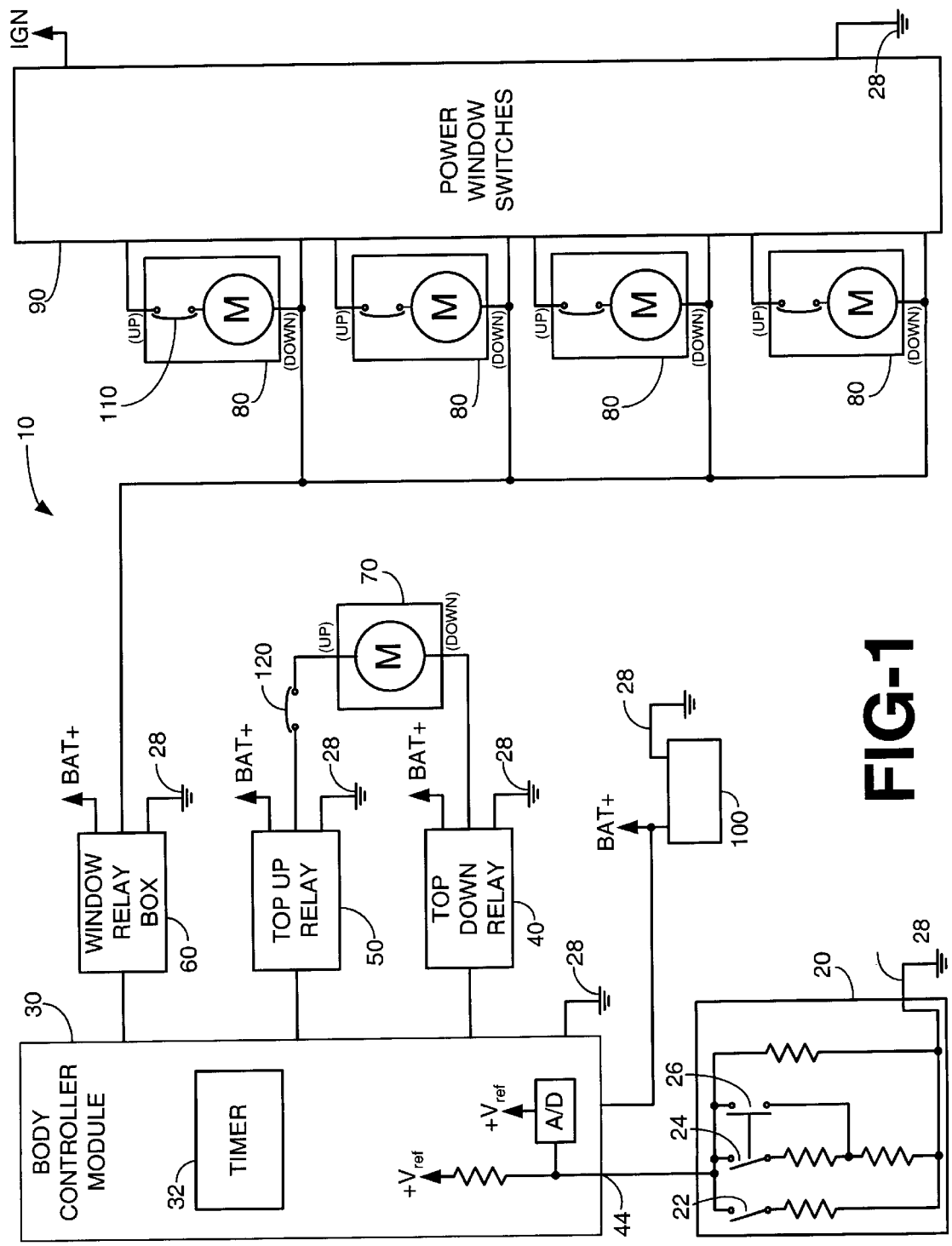
FIG. 1 is a block diagram illustrating a convertible top control system.

Turning now to FIG. 1, a convertible top control system 10 is shown. The control system 10 is centered around a body controller module (BCM) 30 that executes a method 200 shown in FIG. 2 and explained later. The BCM monitors a power top switch assembly 20 that is used by an operator to indicate whether the top should be stopped, raised, lowered, or simultaneously lowered with the windows (express down). Switch assembly 20 is an example of such an assembly that is implemented in a resistive-multiplexed (R-mux) configuration. While the R-mux switch is discussed in more detail below, such a switch arrangement is not be construed as limiting.

R-mux switch assembly 20 is referenced to ground 28 and has an output connected to an analog-to-digital converter (A/D) pin 44 of the BCM 30. The A/D pin 44 of the BCM 30 is pulled-up to a reference voltage ($+V_{ref}$) as is well known in the art. An operator presses switch 22 to indicate a top up state, and presses switch 24 to indicate a top-down state. Pressing switch 24 past a certain point causes switch 26 to close concurrently with switch 24, thereby indicating a top and windows down state. All of the switches 22, 24, and 26 are normally open. When neither switch 22 nor switch 24 is pressed, pin 44 is at a first voltage level. Pressing switch 22 causes a voltage level corresponding to a top-up command to appear at pin 44. Pressing switch 24 causes a voltage level corresponding to a top-down command to appear at pin 44, and pressing switch 24 even further, thereby causing switch 26 to close, effects yet another voltage level at pin 44 corresponding to the top and windows down state.

In accordance with the method 200, the BCM 30 responds to the power top switch 20 by activating one or more of the top up relay 50, the top down relay 40 and relays of the window relay box 60. The output contacts of the top up relay 50 and top down relay 40 are electrically connected across a power top motor 70. The output shaft of the power top motor 70 is mechanically connected to the convertible top (not shown) so that rotating the power top motor 70 in one direction causes the convertible top to move in a top up direction. Similarly, rotating the power top motor 70 in the opposite direction causes the convertible top to move in a top down direction and, finally, stopping the power top motor 70 causes the convertible top to stop moving. The power top motor 70 is preferably electrically protected by a top circuit breaker 120.

As mentioned earlier, the BCM 30 is also electrically connected to a window relay box 60. Actuating the window relay box 60 causes all window motors 80 to roll down the vehicle windows. The window relay box 60 contains a relay for each power window motor 80. The relays inside of the window relay box 60 are electrically connected to the power window motors 80 in such a way that the relays are able to effect downward movement of the power windows by controlling electrical power to the power window motors 80. Each power window motor 80 is preferably protected by a window circuit breaker 110 connected in series with the power window motor 80. The system 10 also includes power window switches 90 electrically connected to the power window motors 80 to allow control of the power windows independent of the BCM 30 and window relay box 60. Electrical power for the convertible top control system 10 is supplied by the vehicle electrical system, symbolized by the battery 100.

Figure 2:
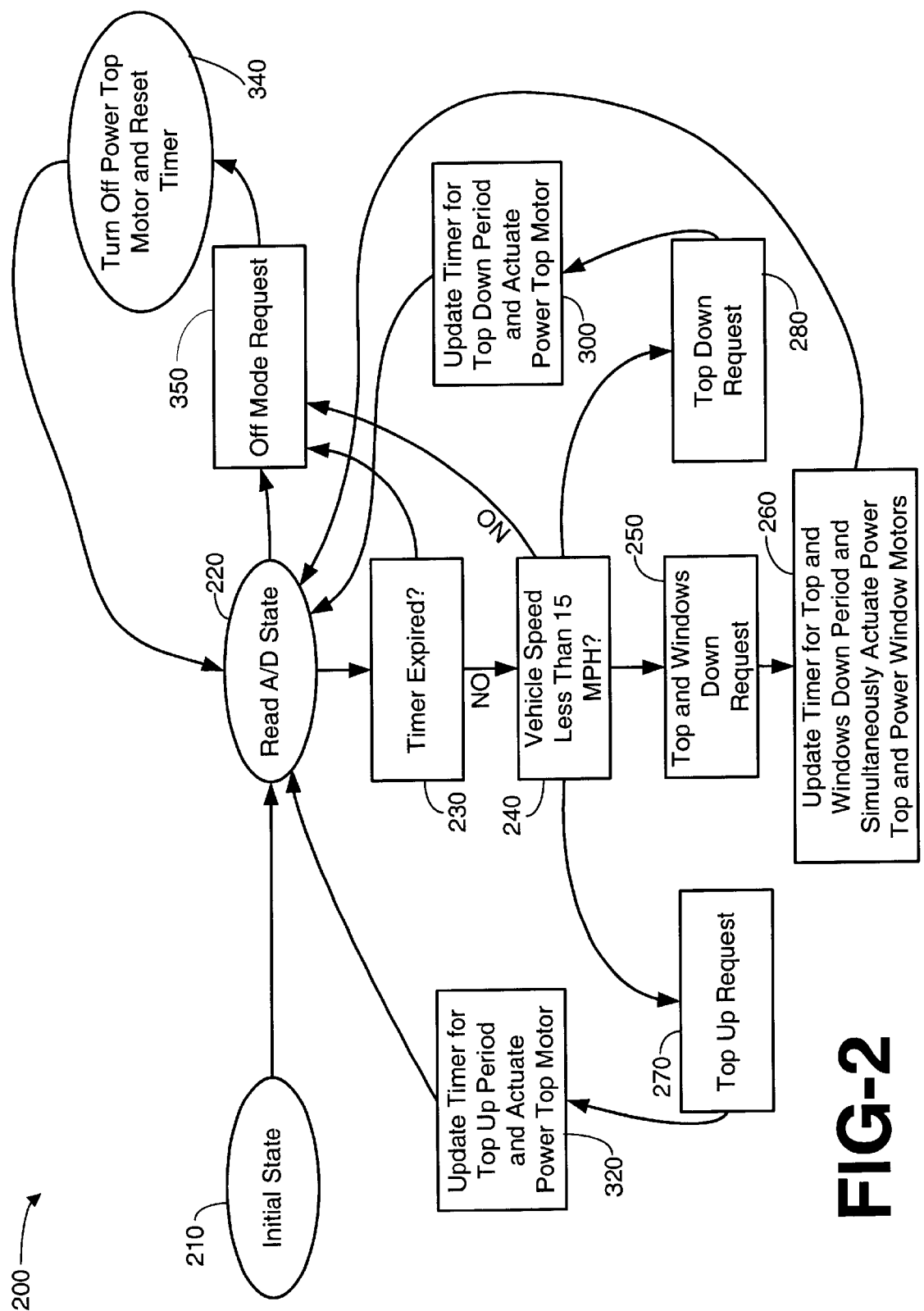
FIG. 2 is a state diagram illustrating a method of controlling a convertible top and power windows.

FIG. 2 shows the control process executed by the BCM 30. At power up, the method starts in state 210 and proceeds to state 220 where it reads the power top switch 20. Upon detection that the power top switch 20 is in any of the top up, top down or top and window-down positions, the method proceeds to state 230 and determines whether the timer 32 has expired. The timer 32 keeps track of the amount of time that the power top motor 70 has been running in response to actuation of switch 20.

Figure 3:
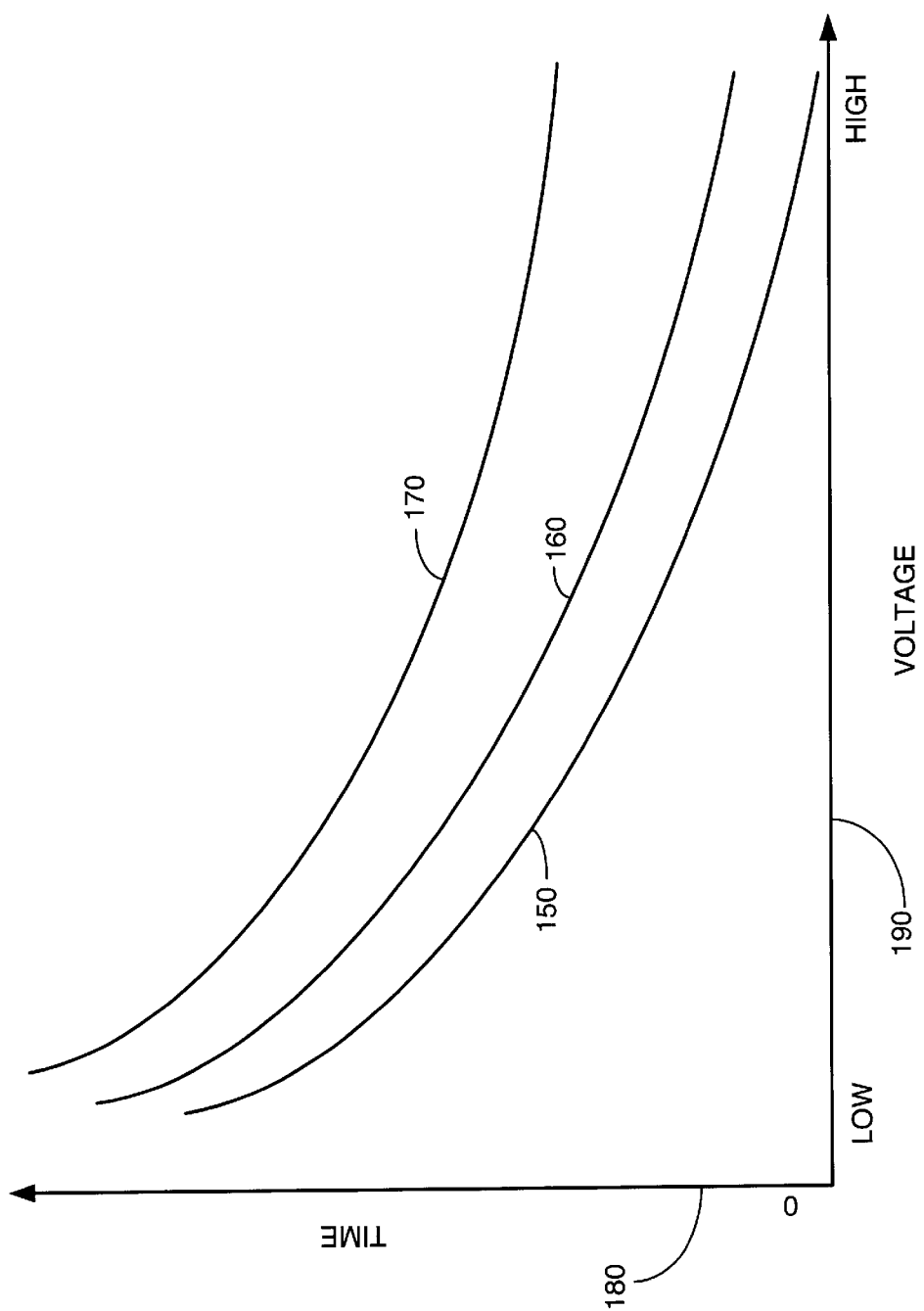
FIG. 3 is an X-Y plot illustrating a predetermined time vs. battery voltage relationship.

Turning briefly to FIG. 3, a graph is shown indicating how the expiration time of the timer 32 is determined. The x-axis 190 of the graph represents the system voltage 100, and the y-axis 180 represents expiration time. Curve 170 represents the maximum amount of time that it should take for the power top motor 70 to raise the convertible top at a given system voltage 100. Similarly, curve 150 represents the maximum amount of time that it should take for the power top motor 70 to lower the convertible top at a given system voltage. Curve 160 represents the maximum amount of time that it should take for the power top motor 70 to lower the convertible top when the power windows motors 80 are simultaneously started with the power top motor 70 (express down). The method 200 allows the power top motor 70 to run for no longer than the predetermined amount of time from these curves to complete the desired operation. By limiting the amount of time the motor may run, the method 200 protects the components of the convertible top structure from being damaged by the drive forces of the power top motor 70 in the event the structure is jammed. The actual shape and relative positions of the curves 150, 160, and 170 will vary depending on physical parameters such as the torque of the motors, the length and gauge of wires used in the system 10, etc. In addition to choosing the time values to correspond to the maximum amount time it should take for the power top motor 70 to complete an operation, the time is also preferably less than the time it takes for the circuit breaker 120 to open when the convertible top is jammed. This allows an operator to clear the jammed top and resume operation of the system 10 without having to wait for the circuit breaker 120 to reset. Both requirements should be satisfied over a range of system voltages to produce a locus of points such as those shown in FIG. 3.

Returning to state 230 in FIG. 2, if timer 32 has expired then the method proceeds to state 350 where the method shows that it has determined to turn off the power top motor 70. The method then proceeds to state 340 where the BCM 30 actually turns off the power top motor 70 and resets the timer 32 before returning to state 220.

Returning to state 230, if the timer 32 has not expired, then the method proceeds to state 240 where it checks whether a predetermined condition has been met. In one aspect of the invention, the predetermined condition is that the vehicle must be travelling at a speed less than fifteen miles per hour. If the predetermined condition in state 240 is not satisfied then the method proceeds to state 350 and executes the aforementioned 110 sequence of states from 350 to 340 to 220, thereby turning off the power top motor 70, resetting the timer 32, and returning to read the power top switch 20.

If, instead, the predetermined condition in state 240 is satisfied, the method proceeds in accordance with the switch position determined in state 220. More specifically, if the method determined the power top switch 20 is in the top up position then the method advances from state 240 to state 270. In state 270 the method acknowledges the top up request before moving to state 320. In state 320, the method updates the timer 32 for a first duration of time 170 and activates the top-up 50 and top down 40 relays in such a manner as to cause power top motor 70 to effect raising of the convertible top. From state 320 the method returns to state 220 where the power top switch 20 is checked once again.

Returning to state 240, if the method determined the power top switch 20 is in the top down position then the method advances from state 240 to state 280. In state 280 the method acknowledges the top down request before moving to state 300. In state 300 the method maintains a the timer 32 for a second duration of time 150 and activates the top-up 50 and top down 40 relays in such a manner as to cause power top motor 70 to effect lowering of the convertible top. From state 300 the method returns to state 220 where the power top switch 20 is checked once again.

Returning to state 240, if the method determined the power top switch 20 is in the express down position, then the method advances from state 240 to state 250. In state 250, the method acknowledges the express down request before moving to state 260. In state 260, the method maintains the timer 32 for a third duration of time 160 and simultaneously activates the top-up relay 50, top down relay 40, and the window relay box 60. This simultaneous activation causes the power top motor 70 to effect lowering of the convertible top concurrently with the lowering of the power windows by window motors 80.

In each of states 300, 320, and 260, the method maintains the timer 32 by initiating the timer on the first entry into the state, and updating the timer value on each entry thereafter. The timer 32 is reset in state 340 when method turns off the power top motor 70.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for raising and lowering at least one window and a convertible top of a vehicle, the control system comprising:

a body controller module having a timer;

an input switch connected to said body controller module, said input switch arranged to provide to the body controller an Indication of the desired position of the convertible top and the at least one window;

a power top motor mechanically linked to the convertible top;

a window motor arrangement mechanically linked to the at least one window;

said body controller module effecting operation of said power top motor and said window motor arrangement in response to said input switch, said body controller continually effecting said operation until the earlier of said timer reaching a predetermined amount of time and relinquishment of said Indication of the desired position; and said predetermined amount of time being of a first duration when said power top motor is controlled to rotate in a first direction, of a second duration when said power top motor is controlled to rotate in a second direction, and of a third duration when said power top motor is controlled to rotate simultaneously with said window motor arrangement.

2. The system of claim 1 wherein said predetermined amount of time is greater than an amount of time needed for said power top motor to move the convertible top from an initial position to said desired position.

3. The system of claim 1 wherein said predetermined amount of time is less than a reaction time of a circuit protection element protecting said power top motor.

4. The system of claim 1 further comprising said predetermined amount of time being a function of a system voltage.

5. The system of claim 1 wherein said input switch comprises a resistively multiplexed switch.

* * * * *